April 23, 1957 B. KAUL 2,789,344
METHOD OF COLD SHAPING TUBULAR STEEL ARTICLES AND PRODUCT
Filed April 23, 1951 4 Sheets-Sheet 1
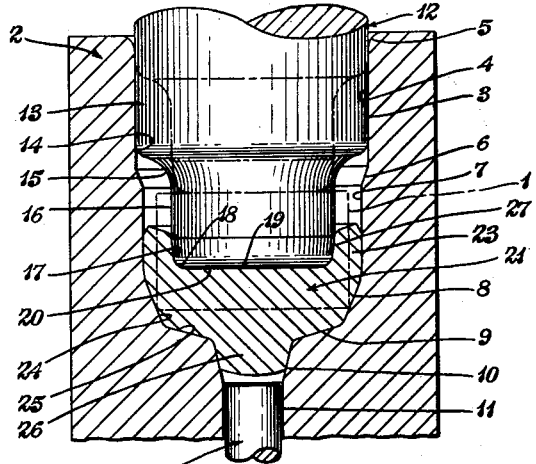
Fig. 2
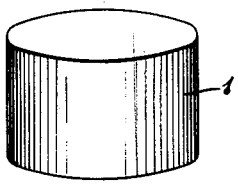
Fig. 1
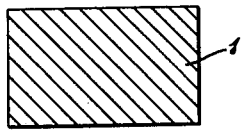
Fig. 9
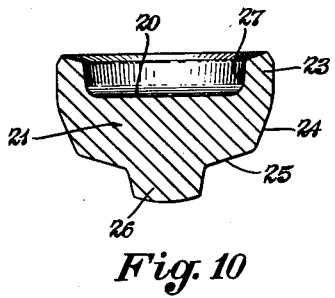
Fig. 10
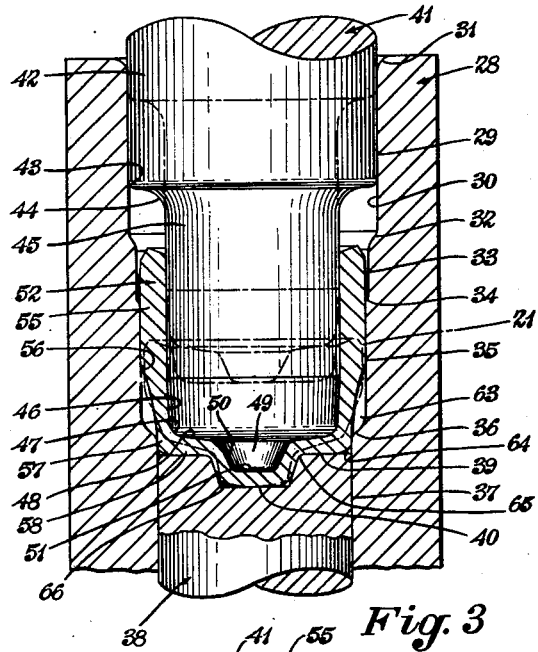
Fig. 3
Fig. 4
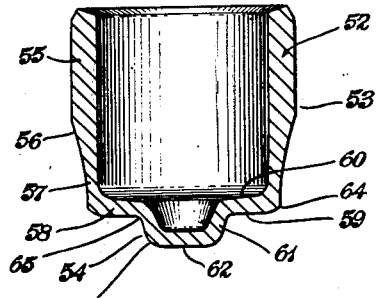
Fig. 11
INVENTOR.
Ben Kaul
BY
Frease, Bishop & Hamilton
ATTORNEYS April 23, 1957  B. KAUL  2,789,344
METHOD OF COLD SHAPING TUBULAR STEEL ARTICLES AND PRODUCT
Filed April 23, 1951  4 Sheets-Sheet 2

INVENTOR.
Ben Kaul
BY
Frease, Bishop & Hamilton
ATTORNEYS

INVENTOR.
Ben Kaul
BY
Frease, Bishop & Hamilton
ATTORNEYS

April 23, 1957           B. KAUL           2,789,344

METHOD OF COLD SHAPING TUBULAR STEEL ARTICLES AND PRODUCT

Filed April 23, 1951           4 Sheets-Sheet 4

INVENTOR.
Ben Kaul
BY
Frease, Bishop & Hamilton
ATTORNEYS

United States Patent Office 2,789,344
Patented Apr. 23, 1957

2,789,344

METHOD OF COLD SHAPING TUBULAR STEEL ARTICLES AND PRODUCT

Ben Kaul, Warren, Ohio, assignor, by mesne assignments, to American Radiator & Standard Sanitary Corporation, New York, N. Y., a corporation of Delaware Application April 23, 1951, Serial No. 222,352

14 Claims. (Cl. 29—535)

The invention relates generally to cold shaping tubular steel articles such as cylinders or containers, and more particularly to cold forming, shaping, flowing and working a solid steel blank into a generally cup-shaped article having a smaller cup-shaped portion projecting integrally axially from the bottom or end wall of the primary cup portion.

Tubular cylinders, containers or receptacles made of steel are frequently used for confining gases, liquids or other materials under pressure, or for other purposes. It is frequently necessary that such articles be provided with a generally cup-shaped protuberance, nipple or button extending axially from a bottom or end wall of the article. Also, it may be necessary to form the walls of such nipples with contours and thicknesses which vary not only within the nipple walls per se but from the main cylinder walls.

Furthermore, it is sometimes necessary that a zone of such nipple wall be formed thin enough to be pierced readily for the release or discharge of the cylinder contents and yet such zone must be strong enough to withstand high internal cylinder pressures without failure prior to piercing the thin nipple wall zone.

The manufacture of a structure satisfying the foregoing conditions or requirements presents a difficult problem regardless of the material and manufacturing procedure used. This problem becomes more complex where it is desired that a least a cup-shaped portion of the cylinder is desired that a least a cup-shaped portion of the cylinder with a protruding nipple be formed of steel in one piece with thin walls, without metal loss incident to the shaping of the cylinder and nipple, and by cold working, shaping, flowing or forming operations to provide a sound, strong, leakproof and pressure resistant article.

I have discovered a solution to this complex problem involving the use of dies of a special design and a procedure or series of steps in the cold working of a metal blank which are inter-related and co-ordinated such that tubular articles of the type described may be successfully produced by cold shaping operations including cold extrustion steps to obtain a desired finished shape having the required strength and hardness provided by the cold working.

Fundamentally, the new procedure involves so controlling the character, location and direction of metal flow in the blank as the same is subjected to cold working under compression in successive stages that sufficient metal at the proper location is provided in the region of the cylinder end wall for the projecting nipple formation, and that the directed flow of metal, and the zones of metal cold worked, in any stage of the procedure does not interfere with the directed flow and cold working of metal in the same or different zones of the blank in subsequent stages of the procedure. The new procedure further involves the controlled shaping of the metal in the blank by directed metal flow under compression characterized by repeated diameter changes, either enlarging or reducing; accompanied by wall elongation and thickness change, by metal flow in changing directions, and sometimes by metal flow in a direction opposite to that occurring in a previous stage of the procedure. Also, the new procedure involves the cold forming, shaping, flowing and working of metal under pressure in such manner that friction between punch and die surfaces and the metal being worked is reduced to a minimum, that the metal blank being worked does not seize to the punch or die, and that the grain in certain zones of the metal worked is crossed. Finally, the new procedure involves subjecting metal in a selected zone while confined to such extreme localized pressure that cold welding or granular fusion of the metal in the localized pressure zone results.

Accordingly, it is a general object of the present invention to provide a new method of cold shaping tubular steel articles to provide an integral, axially projecting, strong, thin-walled nipple or secondary cup-shaped portion at one end thereof.

Furthermore, it is an object of the present invention to provide a new procedure for cold working or flowing the metal in a blank to closed bottom tubular shape with strong, pressure resisting tubular side and bottom walls, having a sound, strong, leakproof, dense pressure resisting frangible nipple wall structure extending integrally axially as a projection from said closed bottom wall.

Likewise, it is an object of the present invention to provide a new cold working procedure for cold welding, densifying or obtaining granular fusion in a predetermined zone of a wall portion of a cold formed steel article.

Furthermore, it is an object of the present invention to provide a new cold working procedure for developing the desired strength in the side and bottom walls of a tubular container having a projecting thin walled nipple at one end thereof without heat treatment for developing such strength.

Also, it is an object of the present invention to provide a new method of making a closed end tubular article having a thin walled nipple projecting from said closed end from a starting blank or slug without any scrap loss incident to the cold forming of such article.

Moreover, it is an object of the present invention to provide a new cold worked steel product having a densified, cold welded or granularly fused zone in a wall thereof.

Furthermore, it is an object of the present invention to provide a new closed bottom pressure resistant tubular article formed of steel ranging from ingot iron to say, .40 carbon steel, having a thin walled cup-shaped nipple projecting from the closed bottom of the article with a substantially flat extremely thin nipple bottom wall.

A further object of the present invention resides in the provision of a die arrangement for cold welding a zone in a wall portion of a cold shaped steel article.

Also, it is an object of the present invention to provide die arrangements for cold working tubular steel articles such that metal flow is directed in the desired manner, that the blank size is increased or reduced in diameter in different regions of the blank accompanied by wall elongation and thickness changes, that the direction of metal flow in certain regions of the blank is changed while avoiding seizing of the metal to the die or punch and minimizing friction, that the formation of cracks or fissures in the walls of the blank is avoided, and that metal flow is accelerated or retarded in various regions where desired.

Finally, it is an object of the present invention to solve the complex problem stated, to eliminate difficulties in the manufacture of tubular steel articles, to generally improve cold working procedures, products and dies, and to obtain the foregoing advantages and desiderata in an effective and simple manner.

These and other objects and advantages, apparent to those skilled in the art from the following description and claims, may be obtained, the stated results achieved, and the described difficulties overcome by the products, die apparatus, methods, steps, operations and procedures which comprise the present invention, the nature of which are set forth in the following general statements, a preferred embodiment of which—illustrative of the best mode in which applicant has contemplated applying the principles—is set forth in the following description and shown in the drawings, and which are particularly and distinctly pointed out and set forth in the appended claims forming part hereof.

The nature of certain discoveries and improvements in my method of cold shaping tubular steel articles may be stated in general terms as preferably including the steps of cold forming a steel slug to primary cup shape by axially compressing and laterally expanding the slug; forming a smaller secondary cup shape in the bottom wall of the primary cup by axial compression; and reducing the diameter, increasing the length and forming cylindrical walls in the secondary cup by axial compression.

The nature of other discoveries and improvements in my method of cold shaping tubular steel articles may be stated in general terms as preferably including the steps of forming a cup-shaped blank having an axially extending tapered nipple projecting from the bottom wall of the blank, forming said nipple into a secondary tapered cup-like projection; and forming the desired length, girth and thickness in the side walls of the secondary cup by reducing, externally and internally laterally confining, and axially compressing the side walls of said secondary cup.

The nature of other discoveries and improvements in my method of cold shaping tubular steel articles may be stated in general terms as preferably including the steps of forming a primary cup-shaped steel blank having a secondary cup-shaped nipple projecting from the bottom wall of the primary cup, forming a continuous raised rib internally of the primary cup around the juncture of the side walls of the secondary cup with the bottom wall of the primary cup, and axially elongating the side walls of the secondary cup by pressing and displacing the metal in said raised rib in the direction in which the secondary cup projects from the primary cup.

The nature of still other discoveries and improvements in my method of cold forming steel articles may be stated in general terms as preferably including the steps of cold forming a thin walled zone in a steel blank, and squeezing the thin walled zone by compression applied normal to the surfaces thereof while laterally confining the metal in said zone to densify the metal in the squeezed, laterally confined zone.

The nature of certain discoveries and improvements in die construction of the present invention may be stated in general terms as preferably including walls forming a recessed die cavity, a punch cooperatively arranged for movement into the die cavity, and selected, cooperatively arranged punch and die cavity surface portions being curved or tapered to direct and control the magnitude and direction of metal flow relative to the punch and die cavity surfaces as metal is being worked under compression between such die cavity surfaces.

The nature of other discoveries and improvements in die construction of the present invention may be stated in general terms as preferably including walls forming a recessed die cavity, a punch cooperatively arranged for movement into the die cavity, opposed flat surfaces formed on the end of the punch and the bottom wall of the die cavity, a secondary nose projecting from the end of the punch, a cooperating secondary recess formed in the bottom wall of the die cavity, and a reentrant groove formed in the flat surface of the punch surrounding the secondary nose.

The nature of other discoveries and improvements in die construction of the present invention may be stated in general terms as preferably including walls forming a recessed die cavity, a punch cooperatively arranged for movement into the die cavity, cooperatively arranged curved surfaces formed on the bottom of the punch and in the bottom wall of the die cavity, a central cylindric opening formed in the bottom of the die cavity, and a tapered secondary nose formed on the bottom of the curved punch nose cooperatively arranged with respect to the cylindric die cavity opening.

The nature of still other discoveries and improvements in die construction of the present invention may be stated in general terms as preferably including walls forming a recessed die cavity, a punch cooperatively arranged for movement into the die cavity, opposed parallel flat surfaces on the bottom of the punch and at the bottom of the die cavity, and formations on the punch and die cavity providing an annular flow orifice of decreasing size as the punch moves to the limit of its penetration into the die cavity whereby metal being worked between the punch and die cavity is confined against radial expansion, and whereby flow thereof from between the bottom of the punch and the bottom of the die cavity is restricted as the punch moves to its limit of penetration into the die cavity.

The nature of certain improvements in cold formed steel articles of the present invention may be stated in general terms as comprising a cup-shaped steel extrusion blank having externally tapered side and bottom wall portions and a tapered nipple projecting axially of the bottom wall.

The nature of other improvements in cold formed steel articles of the present invention may be stated in general terms as comprising a cup-shaped steel extrusion blank having a primary cup-shape with side walls of varying thickness and a tapered cup-shaped nipple projecting axially of the bottom wall.

The nature of still other improvements in cold formed steel articles of the present invention may be stated in general terms as comprising a cup-shaped steel extrusion blank having a tapered cup-shaped nipple projecting axially of the bottom wall of the blank, and a raised rib formed internally of the blank around the juncture of the tapered cup-shaped nipple with the bottom wall of the blank.

The nature of still other improvements in cold formed steel articles of the present invention may be stated in general terms as comprising a cup-shaped steel extrusion blank having thick side walls and a thinner substantially spherically formed bottom wall provided with a substantially cylindrical cup-shaped nipple projecting from the spherical bottom wall axially of the blank.

The nature of still other discoveries and improvements in cold formed steel products of the present invention may be stated in general terms as comprising a pressure-formed steel wall portion, normally exhibiting grain flow lines when etched, densified under confined pressure such that the normal grain flow lines disappear and a solid homogeneous metal structure is presented when etched, further characterized by being resistant to bulging out of flat contour which would normally result in an undensified steel wall portion in the end wall of a pressure container when subjected to extreme internal pressures.

By way of example, the improved methods, die structures and products of the present invention are shown somewhat diagrammatically in the accompanying drawings forming part hereof, wherein:

Figure 1 is a perspective view of a metal blank cut from a piece of bar steel as received from the mill which is used as a starting blank in the cold shaping method of the present invention;

Fig. 2 is a somewhat diagrammatic sectional view illustrating the first or slug sizing and extruding step of the new cold shaping method;

Fig. 3 is a view similar to Fig. 2 showing a second step in the improved method, namely, a backward extrusion primary and secondary cup forming step;

Fig. 4 is an enlarged fragmentary sectional view of a portion of Fig. 3;

Fig. 9 is a sectional view of the blank illustrated in Fig. 1 used as a starting blank for the operation shown in Fig. 2;

Fig. 10 is a sectional view of the blank produced by the operation shown in Fig. 2 and which constitutes the starting blank for the operation shown in Fig. 3;

Fig. 11 is a view similar to Fig. 10 illustrating the blank produced by the operation shown in Fig. 3 which constitutes the starting blank for the operation shown in Fig. 5;

Similar numerals refer to similar parts throughout the various figures of the drawings.

Figure 5:
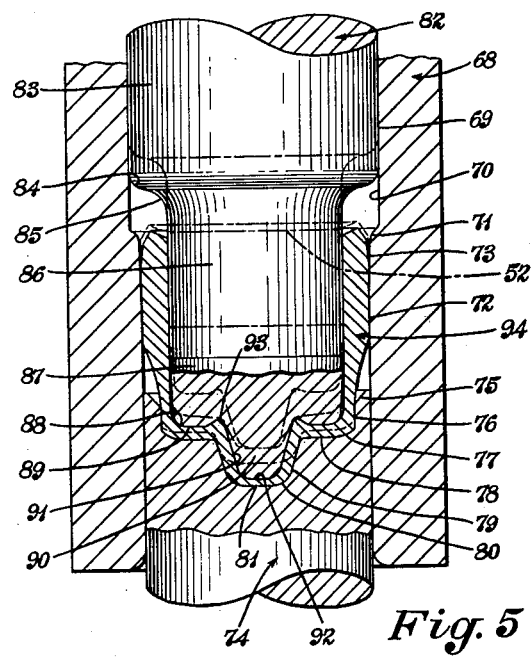
Fig. 5 is a view similar to Fig. 3 illustrating the third step in the improved cold shaping method, namely, a restriking operation for reforming wall portions of the primary and secondary cup.

In the drawings the improved method illustrates the manufacture of a closed pressure cylinder which may be a gas or liquid containing cartridge used for many purposes. However, the invention is not limited to the manufacture of the particular pressure cylinder illustrated, or to the manufacture of a cylinder used as a gas or liquid containing cartridge, inasmuch as the discoveries of the present invention may be used for the manufacture of tubular steel articles used for other purposes having a secondary cup or nipple projecting axially from an end wall of the tubular article, and having other shapes than illustrated. Furthermore, it is to be understood that the invention is not limited to the manufacture of a closed container but is equally adapted for producing tubular articles which are open at one end and have primary and secondary cup formations at the other end thereof.

The starting blank for the new method is indicated at 1 in the drawings and is illustrated as a cylindrical slug which may be cut from bar stock as rolled and as received from the steel mill. Although the use of a cylindrical slug is preferred where a cylindrical tubular article is to be produced, nevertheless the solid starting blank or slug 1 may have a different cross-sectional shape such as oval, square, rectangular, hexagonal, etc., depending on the character of the finished article to be produced.

The amount of steel present in the blank 1 is determined by the amount of steel to be present in the finished cold formed article since there is no scrap loss in carrying out the new cold shaping steps of the improved method. The steel used does not have to have a special or premium analysis as any ordinary carbon steel with a carbon content ranging up to, say, .40 carbon steel is satisfactory.

Bar steel as received from the steel mill may be slightly out of round or have slight diameter variations and these variations must be eliminated from the starting blank in order to preclude die injury or the formation of imperfect articles in subsequent operations. Accordingly, the first step in the new procedure is in part a slug sizing operation for providing a truly concentric blank and eliminating other dimensional variations which may be present in the bar stock from which the starting blank 1 is cut.

In accordance with the present invention the starting blank 1 is placed in the slug sizing die, generally indicated at 2, as shown by dot-dash lines in Fig. 2. Die 2 is formed with a cavity 3 therein which has an upper cylindrical portion 4 provided with a rounded upper corner 5 and connected by an angular shoulder 6 with a reduced cylindrical portion 7 which may be slightly tapered for draft (not shown). The cavity 3 is formed below the reduced cylindrical portion 7 with a tapered annular side wall 8 connected with a tapered bottom wall 9 joined with a reduced tapered portion 10 which terminates in the cylindrical knockout opening 11.

A punch generally indicated at 12 (Fig. 2) is associated with the die 2 having a main cylindrical shank 13 and a rounded corner 14. The shank 13 has a close sliding fit within cylindrical portion 4 of die cavity 3 so that the punch is centered and guided in its movement within die cavity 3. The rounded corners 5 and 14 on the die cavity and punch insure proper entry and alignment of punch 12 in die 2 when performing a cold working operation after starting blank 1 has been inserted in die 2. The punch portion 13 is joined by fillet 15 with a cylindrical nose 16 terminating in a tapered end portion 17 joined by a rounded corner 18 with a flat end or bottom wall 19.

After blank 1 is inserted in die 2, punch 12 is moved downward and engages the top of the blank, the location of the punch at this time being shown by dot-dash lines in Fig. 2. Continued downward movement of the punch applies a compressive force thus driving the blank downward in die cavity 3. The tapered end portion 17 of punch nose 16 enters the metal in the top of the blank and forms a central flat bottomed recess 20 in the top surface of the blank.

As punch 12 moves downward the compressive force exerted on the metal in the blank by punch nose 16 acting on the top of blank 1 causes the blank metal to flow and fill out tapered portions 8, 9 and 10 of die cavity 3, as shown. The compressive force exerted by punch 12 in forming recess 20 also expands the outer periphery of the blank to increase the diameter thereof, accompanied by a small amount of backward extrusion, to fill out the lower end of cylindrical portion 7 of die cavity 3. A prepared or sized blank 21 is thus formed which may be ejected from die cavity 3 by knockout member 22 upon withdrawal of punch 12.

The cold working of blank 1 to form prepared blank 21 thus accurately sizes the periphery of prepared blank 21 under compression to be truly round, thus removing all out-of-roundesss that may have been present in the bar stock from which blank 1 was cut. The cold working also expands by compressive force and backward extrusion the metal in the upper region of the blank to form the tubular blank portion 23 (Fig. 10) surrounding the recess 20. The punch pressure at the top of the blank also forms tapered portion 24 below tubular portion 23, forms tapered bottom wall portion 25 connected with tapered portion 24, and forms tapered button or nipple 26 projecting axially from the bottom of the blank. In forming nipple 26 the metal in the blank flows freely into die portion 10, sufficient clearance being provided above top of knockout member 22 so that the bottom of the nipple does not contact knockout member 22, as shown by the convex rounded bottom surface formed on nipple 26. The inner side wall 27 of recess 20 is slightly tapered upward outwardly, this shape having been imparted by tapered end portion 17 of punch 12.

The metal in blank 21 in the region of tubular portion 23 thereof, also metal adjacent the surfaces of tapered bottom portion 25 and tapered nipple 26, and also metal just below the bottom of recess 20, is cold worked to a considerable degree and substantial work hardening occurs in the metal in these regions of blank 21. However, the metal in the remainder of blank 21 is only cold worked to a slight extent and is not appreciably work hardened, so that it may be subjected to substantial cold working in subsequent operations.

Ordinarily in cold working a metal blank by a procedure including cold extrusion steps, the first or blank sizing operation does not include the formation of a recess, such as recess 20, in sized blank 21 as deep as shown in Figs. 2 and 10. However, this additional recess depth in the present instance has two important purposes. First, the formation of the deeper recess permits sufficient metal in the blank to be displaced downwardly by the punch pressure on the top of the blank to form button or nipple 26 within reduced tapered portion 10 of die cavity 3. Second, recess 20 is sufficiently deep that its side wall 27 assists in the next succeeding operation in centering the punch within recess 20 with respect to blank 21. Thus, punch nose 16 is perfectly centered with respect to die cavity 3, and recess 20 is likewise perfectly centered with respect to the side walls of blank 21, so that the centering function in the next succeeding operation is assured. The importance of this arrangement will be later described.

The angular shoulder 6 in die cavity 3 enlarges the die cavity above cylindrical portion 7 for two purposes. The first is to provide a larger cylindrical portion 4 in die cavity 3 for strength, rigidity and stability of the enlarged punch shank 13 received therein. The second is to reduce the area of contact between the die cavity and prepared blank 21 when the blank is being ejected therefrom by knockout member 22. In other words, as soon as tubular wall portion 23 of blank 21 is moved above angular shoulder 6 there is no further contact between blank 21 and die cavity 3 as the blank 21 is being pushed out of the die cavity.

The tapered portions 8, 9 and 10 in the die cavity 3 also perform important functions. First, they form blank 21 with tapered portions 24, 25 and 26, respectively, which are desired in connection with subsequent operations to be performed on the blank. Second, if tapered annular side wall portion 8 of the die were cylindrical in continuation of cylindrical wall portion 7, if tapered bottom wall portion 9 were flat, and if reduced tapered portion 10 were cylindrical in continuation of knockout opening 11, it would be difficult, if not practically impossible, to displace and flow metal from blank 1 downward to form the small projecting button or nipple 26 and to at the same time completely fill out and size prepared blank 21 in die cavity 3. In other words, tapered die portions 8, 9 and 10 assist in directing and controlling the flow of metal under cold working pressure downward and inward in die cavity 3 to form projecting nipple 26.

Tapered end portion 17 on cylindrical punch nose 16 likewise is important and performs two functions. First, it directs the free expanding and backward extruding flow of metal from blank 1 outward and upward around the punch nose to completely fill the lower part of cylindrical portion 7 of the die cavity and thus to provide a truly round, sized blank. Second, it prevents a concave mushrooming of tubular wall portion 23 of prepared blank 21 from occurring in subsequent operations to be later described, which might occur in carrying out the operation illustrated in Fig. 3 in the event that wall 27 of recess 20 were cylindrical, as by being formed by a cylindrical punch nose omitting tapered end portion 17.

Thus, the operation illustrated in Fig. 2 is essentially a combination sizing, blank preparing and nipple forming operation, performed by cold working blank 1 under compression by flat nosed punch 12, resulting in increasing the diameter of sized blank 21 over that of starting blank 1.

The prepared or sized blank 21 is now ready for the next operation to complete the formation of the primary cup and to form a secondary cup shape in the nipple 26. This operation is essentially a backward extrusion operation and may be performed in the die arrangement illustrated in Fig. 3. This die arrangement includes a die generally indicated at 28 formed with a cavity 29 having an upper cylindrical portion 30 provided with a rounded upper corner 31. The cylindrical portion 30 is connected by an angular shoulder 32 with a reduced cylindrical portion 33 in turn connected by a slight shoulder 34 with a reduced substantially cylindrical portion 35 slightly tapered for draft and terminating in a further angular shoulder 36 and a further reduced cylindrical portion 37. The bottom wall of die cavity 29 is formed by a support member 38 which also serves as a knockout member. The top of support member 38 is formed with a flat annular surface 39 surrounding a tapered flat bottomed recess 40.

A punch generally indicated at 41 is associated with die 28 having a main cylindrical shank 42 and a rounded corner 43. The shank 42 has a close sliding fit within cylindrical portion 30 of die cavity 29 so that the punch is centered and guided in its movement within die cavity 29. The rounded corners 31 and 43 on the die cavity and punch insure proper entry and alignment of punch 41 in die 28 when performing the backward extrusion operation on a prepared blank 21 inserted in die 28. The punch shank 42 is joined by a fillet 44 with a cylindrical nose 45 terminating in a tapered end portion 46 joined by rounded corner 47 with a tapered end 48. A nipple-like secondary nose 49 having tapered side walls 50 and a flat end wall 51 projects axially from tapered end 48 of punch 41.

After a blank 21 is inserted in die 28, as shown in dot-dash lines in Fig. 3, punch 41 is moved downward and engages the top of blank 21. The location of the punch at this time is also shown by dot-dash lines in Fig. 3. Continued downward movement of punch 41 within die cavity 29 applies a compressive force first from the bottom of secondary punch nose 49 and then from tapered end 48 of punch nose 45 within central recess 20 in blank 21, and the punch moves downward to the end of its travel as illustrated in full lines in Fig. 3.

During downward movement of punch 41 the secondary nose 49 thereof enters the metal in blank 21 below recess 20 and tends to displace or flow blank metal generally radially outward. Meanwhile, the tapered end portion 46 of punch 41 also enters the tapered recess side walls 27 of blank 21, is centered thereby, and expands metal in the tubular portion 23 of blank 21 to radially fill the cylindrical portion 35 of die cavity 29.

At the same time downward movement of punch 41 displaces metal in the lower end of blank 21 downward and outward to fill that portion of die cavity 29 formed by the top of support member 38 and cylindrical die portion 37. Thus, because the bottom of die cavity 29 is closed, as punch 41 moves downward, metal in the lower end of blank 21 confined by support member 38 and reduced cylindrical die portion 37 is cold worked and extrudes upward around the punch nose tapered portion 46. The taper on end portion 46 of the punch permits the free expanding and backward extruding flow of metal around the punch nose.

An extruded blank 52 is thus formed which may be ejected from the die cavity 29 by support member 38 upon withdrawal of punch 41. The extruded blank 52 (Fig. 11) has a primary cup formation 53 and a secondary cup formation 54. The primary cup 53 has a thick upper side wall portion 55, an outer angular shoulder 56 tapering into and merging with a thinner lower annular side wall portion 57 and a bottom wall portion 58 externally flat at 59 and slightly internally tapered as indicated at 60. The secondary cup 54 has tapered side walls 61 and a flat bottom wall 62.

During downward movement of punch 41, the blank metal flows or extrudes outward and fills the lower end of the die cavity 29 above angular shoulder 36 and then extrudes upward between punch nose 45 and die cavity portion 35. At a certain stage, the shoulder 56 formed on the resulting blank moves upward away from die shoulder 36 indicated by clearance space 63 in Fig. 3. This clearance formation occurs as rounded punch corner 47 approaches angular die shoulder 36. During such approach, the annular escape orifice between corner 47 and shoulder 36 diminishes in size thereby forming the tapering thinner wall portion 57 in the resulting blank 52.

The cold working of prepared blank 21 to form extruded blank 52 is severe. Little work is performed on tubular portion 23 of blank 21 which becomes the upper end of primary cup wall 55, the portion 23 having previously been cold worked to a considerable extent. Similarly, the outer surface or contour of the bottom end of the blank 21 which was previously cold worked to some extent is not substantially changed in forming the outer bottom contour of primary cup 53 and the outer contour of secondary cup 54. However, the additional working of previously cold worked portions of the blank, and the severe cold working of metal in the remaining portions of the extruded blank 52 is substantially to the limit of its workability and so hardens the metal in the blank that the extruded blank 52 must be normalized after the operation of Fig. 3 is completed and before further cold working operations are performed thereon.

Referring to Fig. 3 and to the sizes and shapes, respectievly, of blanks 21 and 52, the largest outer circumference of blank 21 is enlarged or expanded in blank 52, the diameter of rounded bottom corner 64 of blank 52 is enlarged or expanded from the size of the corner between tapered surfaces 24 and 25 of blank 21, and the diameters of corners 65 and 66 at the top and bottom, respectively, of tapered secondary cup side wall 61 are enlarged or expanded from the size of similar corners in blank 21. Thus, in the operations thus far described, the starting blank 1 has been increased in size or expanded in girth by the successive cold working operations performed thereon depicted in Figs. 2 and 3.

Similarly, the internal diameter of primary cup 53 is also enlarged or expanded over the internal diameter of tapered recess side walls 27 of blank 21. The tapered surfaces 46, 48 and 50 provided on punch 41 cooperate with the die cavity contour to enable the expanding working of blank 21 just described to be performed; and at the same time flat bottom 51 on secondary punch nose 49, which bottoms against the blank metal on the flat bottom wall of support member recess 40, prevents the punch from piercing the bottom of the blank.

Certain of these tapered surfaces on punch 41 perform additional functions. Thus, tapered punch surfaces 50 and 48 cooperate to assist, direct and control metal flow outward and upward from the central region of blank 21 around the punch corner 47 in backwardly extruding to form the side walls of the primary cup 53.

The tapered nose portion 46 on punch 41 also assists in centering the punch with respect to blank 21 in recess 20 thereof at the beginning of downward movement of the punch. This centering is important because meanwhile secondary nose 49 on punch 41 is also working metal in the blank below the bottom of blank recess 20 which might throw the punch slightly off center with respect to the blank 21 if this separate centering means were not provided.

The tapered recess side wall surface 27 and tapered nose portion 46 on punch 41 also cooperate to provide a further important characteristic in connection with the operation shown in Fig. 3. As secondary punch nose 49 enters the metal below the bottom of recess 20 in blank 21, adjacent metal in the blank moves radially outward around nose 49 until tubular portion 23 expands sufficiently to fill die cavity portion 35. This metal flow increases the diameter of the bottom corner of recess 20 to a greater extent than upper portions of the side wall surface 27, and if surface 27 were not tapered downward and inward, concave mushrooming of the tubular wall portion 23 might occur such that the diameter of surface 27 at the bottom corner of recess 20 would become larger than other internal diameter portions of wall 55 of primary cup 53. If such mushrooming should occur, an annular seam causing a crack in the finished article might result. The tapering of wall surface 27 accompanied by the following expanding action of tapered portion 46 of punch 41, which slightly expands the original recess 20 from top to bottom, prevents this mushrooming from occurring.

Referring to Fig. 4, tapered portions 46 and 48 and rounded corner 47 at the nose of punch 41 have a further important function. As the metal in blank 21 extrudes outward and upward around the punch nose, as indicated by the narrows in Fig. 4, the metal flow is outwardly directed by tapered end wall 48 on the punch. The metal then flows around rounded punch corner 47 and its tendency is to continue to flow outward in a rounded path away from the side wall of the punch nose, being directed upward by die shoulder 36. This results in the formation of a slight clearance 67 between lower side wall portion 57 of resulting blank 53 and tapered end portion 46 of the punch. Thus, friction between the resulting blank 53 and the lower portions of the punch is substantially eliminated.

The metal flow just described in connection with Fig. 4 is also characterized by the formation of the rounded corner 64 at the bottom of primary cup portion 53, as illustrated. Similarly, the displacement and flow of metal around secondary punch nose 49 is characterized by the formation of a rounded corner 66 at the bottom corner of secondary cup portion 54.

The slight taper for draft provided in die portion 35 reduces friction between extruded blank 52 and die portion 35 as the side walls of the blank extrude upwardly; and enlargement 33 in the die cavity above shoulder 34 functions in a similar manner, and also reduces the area of die contact with extruded blank 52 when the blank is ejected from the die. The enlarged die portion 30 also functions in a similar manner in addition to providing a guide for the main shank 42 of punch 41.

The tapered side wall of button 26 in blank 21 assists in centering blank 21 when it is inserted in die 28 and in forming tapered side walls for secondary cup portion 54 in extruded blank 52. The tapered side wall 61 in blank 52 likewise assists in centering blank 52 in subsequent operations. Furthermore, the tapered shape of secondary cup 54 in blank 52 assists in properly sizing secondary cup 54 during the operation illustrated in Fig. 3, to provide, particularly in the top portion of secondary cup 54 the diameter of which is larger than the diameter of the corresponding portion of blank 21, sufficient metal for subsequent elongation and reduction of secondary cup 54.

During the formation of extruded cup 52 by the operations depicted in Figs. 2 and 3, the normal grain flow lines occurring in starting blank 1, extending axially with respect to the location of blank 1 in die 2, are severely deformed, by the axial compression to which the blank has been subjected, in bottom wall 58 of primary cup portion 53 and in bottom wall 62 of secondary cup portion 54, so that the grain flow lines when an etched specimen is prepared appear as a twisted, tangled, fiberous mass. This starts the crossing of the grain in bottom walls 58 and 62, other stages of which procedure will be described later.

Accordingly, the operation illustrated in Fig. 3, which is essentially a backward extrusion operation, completes the formation of extruded blank 52 to primary and secondary cup-shape, flattens the bottom walls of the primary and secondary cups, sizes tapered secondary cup portion 54, and increases the diameter of blank 52 in various regions over that of prepared blank 21.

The extruded blank 52 is now ready for the next operation to restrike and reform the bottom of the blank. This operation may be performed in the die arrangement illustrated in Fig. 5 which includes a die generally indicated at 68 formed with a cavity 69 having an upper cylindrical portion 70 which may be provided with an upper rounded corner (not shown). The cylindrical portion 70 is connected by an angular shoulder 71 with a reduced cylindrical portion 72, the upper end of which may be slightly tapered at 73 for a purpose to be later described.

The bottom wall of die cavity 69 is formed by a support member 74 which also serves as a knockout member. The top of support member 74 is formed with an angular annular shoulder 75 from which a reduced cylindrical portion 76 extends downward to a curved annular corner portion 77 which merges with a flat annular surface 78 surrounding a tapered recess 79 connected by curved annular corner 80 with flat recess bottom wall 81.

A punch generally indicated at 82 is associated with die 68 having a main cylindrical shank 83 and a rounded corner 84. The shank 83 has a close sliding fit within cylindrical portion 70 of die cavity 69 so that the punch is centered and guided in its movement within die cavity 69. The rounded corner 84 on the punch cooperates with a similar rounded corner at the upper end of the die cavity to insure proper entry and alignment of punch 82 in die 68 when performing the restriking operation on an extruded blank 52 inserted in die 68. The punch shank 83 is joined by a fillet 85 with a cylindrical nose 86 terminating in a tapered end portion 87 joined by a rounded corner 88 with a flat annular end wall portion 89. A nipple-like secondary nose 90 having tapered side walls 91 and a slightly rounded end wall 92 projects axially from the lower end of punch nose 86, and an annular reentrant groove 93 is formed where secondary nose 90 joins flat end wall portion 89 of punch nose 86.

When a blank 52 is inserted in die 68, as shown in dot-dash lines in Fig. 5, secondary cup portion 54 of blank 52 rests in the upper portion of tapered die recess 79. The taper of die recess 79 is greater than the taper of wall 61 of blank 52 so that flat bottom wall 59 of blank 52 is held spaced above flat annular die surface 78, as shown. The tapered walls 61 and 79 cooperate to center blank 52 within the lower portion of die cavity 69. The diameters of upper blank wall portion 55 and cylindrical die cavity portion 72 are substantially the same so that the blank snugly fits within and is centered in the upper end of the die cavity.

After blank 52 is inserted in die 68, punch 82 is moved downward and its secondary nose 90 engages the inside of bottom wall 62 of secondary cup portion 54. The location of the punch at this time is shown by dot-dash lines in Fig. 5.

Continued downward movement of punch 82 within die cavity 68 forces the metal in secondary cup 54 of blank 52 into the smaller tapered die cavity recess 79 thereby elongating the side walls of secondary cup 54. As punch 82 moves to the limit of its downward movement, the elongated secondary cup walls are thinned and the bottom wall of the primary cup is thinned somewhat and flattened. Excess metal resulting from this restriking operation gathers in an annular rib which forms at the juncture of the secondary cup with the bottom of the primary cup in reentrant groove 93 in the end of punch nose 86. Such excess metal may also result in a very slight backward extrusion of the blank.

Figure 12:
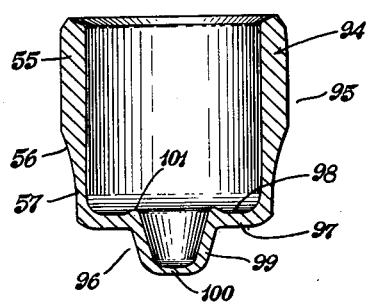
Fig. 12 is a view similar to Fig. 11 illustrating the blank produced by the operation shown in Fig. 5 which constitutes the starting blank for the operation shown in Fig. 6.

A restruck blank 94 is thus formed which may be ejected from die cavity 69 by support member 74 upon withdrawal of punch 82. The restruck blank (Fig. 12) has a primary cup formation 95 and a secondary cup formation 96. The primary cup 95 has the same thick upper side wall portion 55, the outer angular shoulder 56 and the thinner lower annular side wall portion 57 present in extruded blank 52 from which restruck blank 94 was formed. The bottom wall 97 of primary cup 95, however, is thinned somewhat and its inside surface 98 is flattened. The secondary cup 96 has tapered side walls 99 and a bottom wall 100 externally flat and internally concave, as shown. As previously described, the annular inwardly projecting rib 101 is formed where the top interior surface of secondary cup 96 joins the inner flat surface 98 of primary cup bottom wall 97.

The diameter of punch portion 86 is the same, except for working clearance, as the internal diameter of blank 52 so that no cold working is performed on the side walls of primary cup portion 95 of blank 94. The restriking operation illustrated in Fig. 5 provides the correct amount of metal in bottom wall 97 of primary cup portion 95 and in the walls of secondary cup portion 96, necessary for further formation of these portions in subsequent operations. In this connection the formation of annular rib 101 is particularly important since it provides metal in this region of restruck blank 94 for a purpose to be later described.

Since the side walls of secondary cup portion 96 are reduced in size with respect to portion 61 of blank 52 by pushing the secondary cup into smaller die cavity recess portion 79, the twisted grain flow lines in the metal therein, and particularly in the bottom wall 100 thereof, are radially compressed which constitutes a further stage in crossing the grain in the bottom wall of secondary cup 96.

In the event that some slight backward extrusion occurs in the side walls of blank 94 during the restriking operation, the tapered end portion 87 on punch nose 86 permits the metal to move freely upward around the lower end of the punch nose. The tapered punch portion 87 also insures proper centering of punch 86 within blank 52 as the punch descends.

The slight tapered portion 73 of die cavity 69, in addition to facilitating entry of blank 52 within the die cavity, insures that no cold working of the upper end of side walls 55 of blank 94 will occur.

Accordingly, the operation illustrated in Fig. 5 restrikes and reforms the bottom of the blank in preparation for subsequent operations and restruck blank 94 is now ready for the next operation to form a rounded or curved end for primary cup 95 and to reform secondary cup 96.

Figure 6:
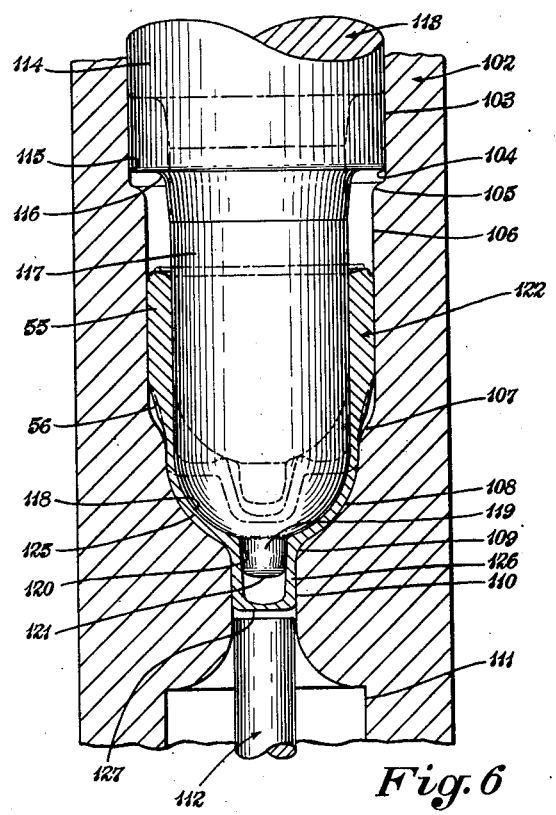
Fig. 6 is a view similar to Fig. 5 showing the fourth step in the cold shaping method of the present invention, namely, a further extrusion, coining and end rounding operation for reforming certain wall portions of the primary and secondary cup.

This operation may be performed in the die arrangement illustrated in Fig. 6 which includes a die generally indicated at 102 formed with a cavity 103 having an upper cylindrical portion 104 which may be provided with an upper rounded corner (not shown). The cylindrical portion 104 is connected by an angular shoulder 105 with a reduced cylindrical portion 106 terminating in an angular shoulder 107 which is connected with a spherically rounded portion 108 connected by a curved corner 109 with a reduced cylindrical opening 110. The opening 110 is enlarged at 111 below its working portion and a knockout member 112 is associated with cylindrical opening 110 which for strength may be provided with an enlargement (not shown) received in enlarged portion 111 when knockout member 112 is moved upward.

A punch generally indicated at 113 is associated with die 102 having a main cylindrical shank 114 and a rounded corner 115. The shank 114 has a close sliding fit within cylindrical portion 104 of die cavity 103 so that the punch is centered and guided in its movement within die cavity 103. The rounded corner 115 on the punch cooperates with a similar rounded corner at the upper end of the die cavity to insure proper entry and alignment of punch 113 in die 102 when working a restruck blank 94 inserted in die 102. The punch shank 114 is joined by a fillet 116 with a cylindrical nose 117 terminating in a spherically-formed end 118. A nipple-like secondary nose 119 having tapered side walls 120 and a slightly rounded end 121 projects axially from the lower end of punch nose 117.

When a blank 94 is inserted in die 102, as shown in dot-dash lines in Fig. 6, the bottom corner of primary cup portion 95 rests in the upper portion of spherical die portion 108. The diameters of upper blank wall portion 55 and cylindrical die cavity portion 106 are substantially the same so that the blank snugly fits within and is centered in the upper end of the die cavity.

After blank 94 is inserted in die 102, punch 113 is moved downward and its spherical end 118 engages annular rib 101 on the inside of bottom wall 97 of blank 94. The location of the punch at this time also is shown by dot-dash lines in Fig. 6.

Continued downward movement of punch 113 within die cavity 103 reforms the bottom of blank 94. As this reforming progresses, the lower end of secondary cup 96 is forced downward into and enters die cavity portion 110, being directed and centered during such entry by curved corner 109. Since the diameter of cylindrical die portion 110 is smaller in size than portions of tapered side walls 99 of secondary cup 96 of blank 94, the constricting force normally would tend to thicken the side walls of secondary cup 96 progressively greater toward its top because of its tapered shape.

This result is prevented because meanwhile secondary punch nose 119 moves downward within secondary cup 96 and, because of tapered side wall 120, presents a progressively smaller escape orifice between its outer surface and the contour of die cavity portion 109–110. Thus, the tapered secondary nose 119–120 directs and controls the flow of metal in secondary cup 96 of blank 94, as the metal is being worked, to prevent the metal wall from thickening and to produce a forward extrusion of the metal in the secondary cup side walls thereby elongating the same as the cup diameter is reduced and reformed to substantially cylindrical shape.

Figure 13:
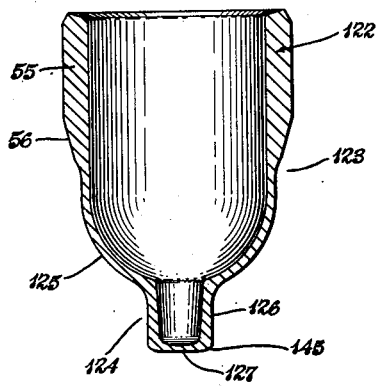
Fig. 13 shows the blank produced by the operation shown in Fig. 6 and which may comprise the blank being worked in the operation depicted in Fig. 7.

A reformed blank 122 is thus produced which may be ejected from die cavity 103 by knockout member 112 upon withdrawal of punch 113. The reformed blank 122 (Fig. 13) has a primary cup formation 123 and a secondary cup formation 124. The primary cup 123 has the same thick upper side wall portion 55 and outer angular shoulder 56 present in the extruded blank 52 and restruck blank 94 from which reformed blank 122 was formed. The bottom wall 125 of primary cup 123, however, is thinned and formed to somewhat semispherical shape. The secondary cup 124 has cylindrical side walls 126 and a bottom wall 127 externally flat and internally slightly concave, as shown, side walls 126 having substantial uniform thickness and being somewhat thicker than bottom wall 127. If it is desired that side walls 126 of cup 124 should have varying or tapering thickness, this can be accomplished by changing the taper of punch nose 119.

Referring to Fig. 6, punch 113 in approaching and reaching its limit of downward movement applies a compressive force which severely cold works and coins the metal in semispherical bottom wall portion 125 of blank 122, thereby hardening the metal in this portion of the blank to the desired extent. The working and extrusion of the metal in side walls 126 of secondary cup 124 also hardens this portion of the blank. However, metal in bottom wall 127, wall portion 55 and shoulder 56 of blank 122 is still soft.

The working of the metal in spherical bottom wall 125 of blank 122 as punch 113 bottoms in die 102 also compresses the deformed grain flow lines in the metal, thereby completing the crossing of the grain in this portion of the blank.

It will be observed that the pressure on secondary cup 96 of blank 94 by punch 113, as the blank is being reformed, is transmitted through rib 101. As punch 113 drives home, the final extruding pressure on secondary cup portion 124 moves the metal in side walls 126 thereof downward from rib 101. Rib 101 thus provides the necessary metal to obtain the desired finished length for secondary cup portion 124, which is greater than the length of secondary cup 96 of blank 94. In this manner, by the design of the size of reentrant groove 93 in punch 82 and by controlling the stroke of punch 82, the desired amount of metal may be provided in blank 94 at rib 101 to obtain the proper size and length in secondary cup portion 124 in blank 122.

Thus, the operation illustrated in Fig. 6 forms a curved end wall in the bottom of the blank, coins the curved area to obtain the desired strength, and reduces the diameter of and elongates the nipple projecting axially from the curved area. The reformed blank 122 is now ready for the next operation during which bottom wall 127 of blank 122 is further cold worked.

Figures 7, 15:
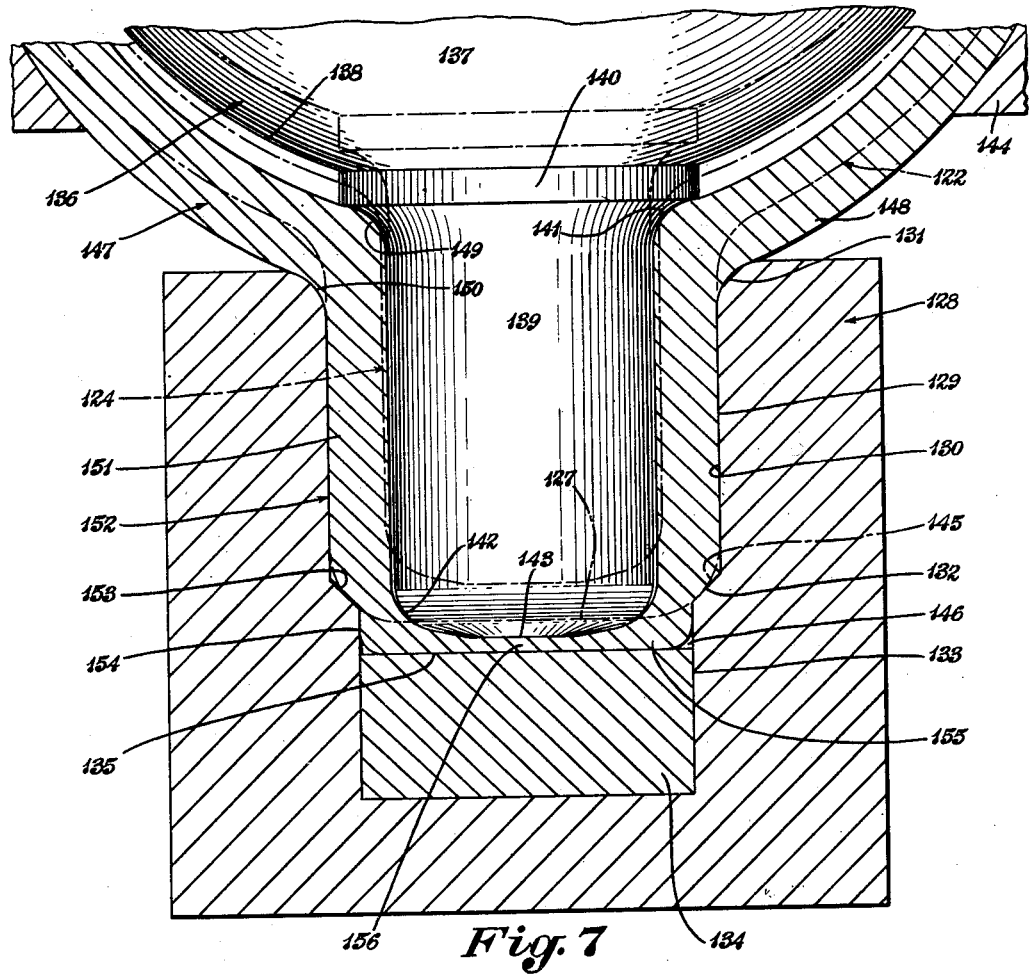
Fig. 7 is a greatly enlarged diagrammatic sectional view of a die arrangement employed in a subsequent step of the method, that is, the cold welding of the bottom wall of the secondary cup.
Fig. 15 is a longitudinal sectional view of a tubular steel pressure cylinder or container which may be made from the blank shown in Fig. 14.

This operation may be performed in the die arrangement illustrated in Fig. 7 which includes a die generally indicated at 128 formed with a cavity 129 having a cylindrical portion 130 provided with an upper rounded corner 131. The cylindrical portion 130 is connected by an angular shoulder 132 with a reduced cylindrical portion 133 in which a die insert 134 is located having a flat top 135, the insert 134 being made of the strongest and hardest deflection resisting die block material obtainable.

A punch generally indicated at 136 is associated with die 128 having a main shank 137 terminating in a rounded end 138. A reduced cylindrical nose 139 projects axially from shank 137 and is provided with an enlarged top portion 140 which is joined with cylindrical portion 139 by a rounded fillet 141. The lower end of nose 139 is formed with a rounded corner 142 and nose 139 has a central flat end zone 143. The punch nose 139 is also made of the strongest and hardest deflection resisting die block material obtainable. A stripper plate 144 is also associated with punch 136 and die 128.

When a blank 122 is inserted in die 128, as shown in dot-dash lines in Fig. 7, the lower outer corner 145 between the bottom and side walls of the secondary cup 124 rests on angular die shoulder 132 and the diameters of the side wall of cup portion 124 and of die portion 130 are the same so that the blank snugly fits within and is centered in die cavity 129. After blank 122 is inserted in die 128, punch 136 is moved downward and the end of its nose 139 engages the bottom wall 127 of cup portion 124. The location of the punch at this time also is shown by dot-dash lines in Fig. 7, and it will be noted that the diameter of cylindric nose portion 139 is slightly less than the internal diameter of the side walls of cup portion 124.

In Fig. 7 the parts are shown greatly enlarged in order clearly to describe the action that takes place. Continued downward movement of punch 136 drives the lower end of cup portion 124 downward into die cavity 129 so that the metal substantially completely fills out the die cavity excepting the bottom annular corner, as indicated by the clearance space 146. As punch nose 139 drives home, the escape area between rounded corner 142 and angular shoulder 132 diminishes in size so as to prevent further displacement or flow of metal through this escape area. Thus, a certain amount of metal is trapped between die insert 134 and the bottom of punch nose 139. Extreme pressure is exerted on this trapped metal between the punch nose and die insert and particularly between flat bottom wall zone 143 of the punch nose and flat top surface 135 of insert 134.

At the same time, the metal at the inner and outer top corners of secondary cup portion 124 is reshaped by the rounded corners 131 and 141 of the die and punch, respectively.

An extrusion blank 147 is thus produced having a very slightly thickened lower curved wall portion 148 joined by rounded fillets 149 and 150 with the cylindrical side walls 151 of secondary cup portion 152. Cup 152 terminates in an outer angular shoulder 153, a reduced end 154 and a thin bottom wall 155. The central zone 156 of thin bottom wall 155 has flat parallel surfaces.

As the metal is worked between die 128 and punch 136 there may be some slight displacement of metal upward in side walls 151 of cup portion 152 causing a slight thickening of the same while still maintaining some clearance between the inner surface of side walls 151 of cup portion 152 and punch nose 139. Punch 136 is then withdrawn and stripper plate 144 is actuated to extract extrusion blank 147 from die 128.

I have discovered that in working the metal in the manner described in connection with Fig. 7, the metal in thin bottom wall 155 is actually compressed and densified, particularly in central flat zone 156 thereof, such that in an etched specimen grain flow lines have completely disappeared and granular fusion in effect has resulted. This phenomenon may also be described as "cold welding" of the metal in thin bottom wall 155 and particularly in central flat zone 156 thereof without, however, joining any other metal part thereto.

During the operation and prior to the attainment of "cold welding" and cold granular fusion, the crossing of the grain is completed in bottom wall 155 of secondary cup 152, all porosity in the metal is eliminated, and a sound, dense, strong metal structure is obtained in a thin wall which in actual production has been made as thin as .005″. Further, a cold welded wall of such thinness has withstood pressures as high as 8000 pounds per square inch.

In obtaining cold welding, it is absolutely essential that flat parallel surfaces 143—135 be provided on the punch and die. Without such flat parallel surfaces, the punch will pierce the metal. Such piercing is prevented by the use of the described flat surfaces, by the diminishing escape area between shoulders 142 and 132, and by reduced cylindrical die portion 133 which confines the trapped metal so that it cannot expand radially from the extreme pressure exerted between the flat surfaces 143 and 135.

As indicated, the die block metal used for insert 134 and punch nose 139 is the hardest and strongest and most deflection resistant die block material obtainable, in order to reduce to a minimum the occurrence of any deflection in these parts under the terrific die pressures existing. It is believed that some slight deflection of the top surface of insert 134 may occur but when formed of the type of material described, insert member 134 restores itself to normal position at the completion of the operation.

The extrusion blank 147 is now ready for the next operation for extruding the side walls thereof to elongated form. This operation may be performed in the die arrangement illustrated in Fig. 8 which includes a die generally indicated at 157 formed with a cavity 158 having an upper cylindrical portion 159 which may be provided with an upper rounded corner 160. The cylindrical portion 159 is connected by an angular extrusion shoulder 161 with a cylindrical extrusion orifice 162, relieved at 163, and communicating with a guide opening 164 in which knockout 165 may be reciprocated.

A punch generally indicated at 166 is associated with die 157 having a main cylindrical shank 167 formed with an extrusion shoulder 168 which merges into a reduced tapered portion 169 at the upper end of the punch nose 170. Below tapered portion 169 nose 170 is formed with a cylindrical portion 171 and a slightly tapered portion 172. The punch 166 has a close sliding fit within cylindrical portion 159 of die cavity 158 so that the punch is centered and guided in its movement within die cavity 158. The rounded corner 160 on die 157 cooperates with extrusion shoulder 168 on punch 166 to insure proper entry and alignment of punch 166 in die 157.

Figures 8, 14:
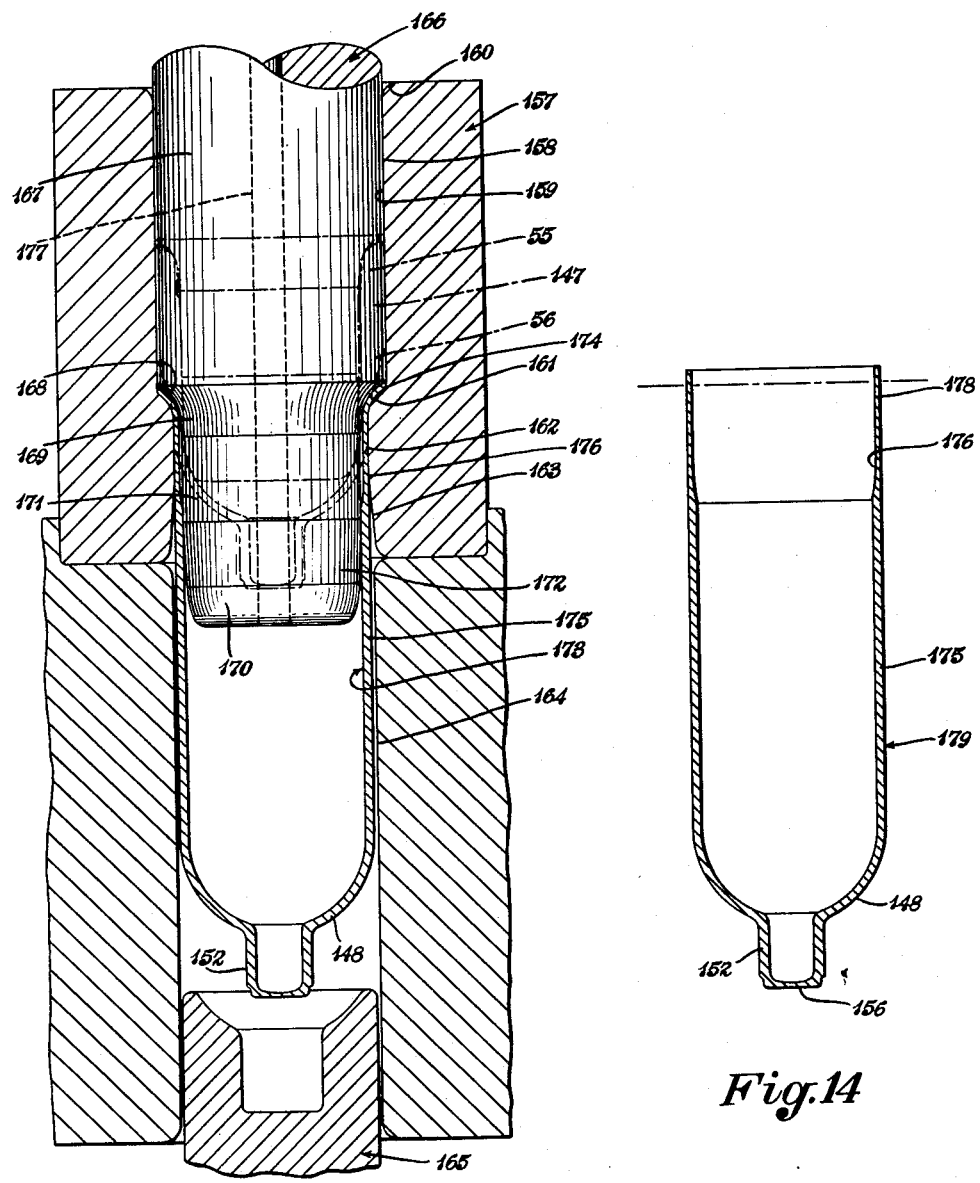
Fig. 8 is a view similar to Fig. 6 illustrating a subsequent forward extruding step for elongating the side walls of the article formed in Fig. 6 to elongated tubular shape.
Fig. 14 is a diagrammatic sectional view illustrating subsequent steps of drawing through and trimming to length which may be performed upon the article produced by the operation shown in Fig. 8.

When an extrusion blank 147 is inserted in die 157, as shown in dot-dash lines in Fig. 8, shoulder 56 thereof rests on die extrusion shoulder 161, the diameter of the upper end of spherical bottom wall 148 just fitting within extrusion orifice 162. After blank 147 is inserted in die 157, punch 166 is moved downward and its nose 170 enters into blank 147 until punch extrusion shoulder 168 engages the top annular surface of side wall 55 of blank 147. The location of the punch at this time also is shown by dot-dash lines in Fig. 8.

Continued downward movement of punch 166 applies an extrusion pressure or force through extrusion shoulder 168 to the upper end of side walls 55 of blank 147 and the metal in the thick side walls is forced under compression downward and is extruded through the escape area between extrusion shoulder and orifice 161—162, and punch nose 170. This extrusion operation not only thins and elongates the metal in the side wall of the piece but work hardens the same to the desired degree of hardness depending upon the character of the restricted escape or flow area between the punch and extrusion shoulder through which the metal is extruded.

The final limit of downward movement of punch 166 and of the extruded tubular blank 173 resulting from the extruding operation are shown in full lines in Fig. 8. A flange 174 remains at the upper end of the tubular side walls 175 of blank 173, and side walls 175 extend upwardly from curved bottom wall portion 148 and secondary cup portion 152 previously formed in the final bottom forming operation of Fig. 7.

The metal in blank 173 has been cold worked in all portions thereof excepting flange 174 to the final desired degree of hardness, while the metal in flange 174 still remains relatively soft. In order to avoid damage to punch 166, die 157, blank 147 or tubular blank 173, no pressure is applied to the finally completed bottom wall 148 of blank 147 at the beginning of the extrusion operation, a slight clearance between the end of punch nose 170 and bottom wall 148 of blank 147 being present when the parts are in the position indicated by dot-dash lines.

During downward movement of punch 166 in die 157, tapered portion 172 on punch nose 170 is such that no pressure is exerted on the thin upper end of bottom wall 148 of blank 147 below shoulder 56, because the walls of this portion of the article have been completed in previous operations. However, cylindrical portion 171 of punch 166 cooperates with die extrusion orifice 162 to form the elongated side walls 175 of uniform thickness for a certain distance. As tapered portion 169 of punch nose 170 commences to enter extrusion orifice 162, the escape area within the orifice progressively decreases slightly to thin the upper side wall portion of blank 173, as indicated at 176.

A vent 177 is provided in punch 166 through punch nose 170 communicating with the space between the bottom of the punch and the interior of blank 147 for the relief of any pressure which may be built up by an excess accumulation of lubricant within the blank 147 at the start of the extrusion operation.

The tubular blank 173 may then be drawn through a die in the usual manner to reform the flange 174 at the upper end thereof to be cylindrical, as indicated at 178 in Fig. 14, in continuation of thin wall portion 176 thereby producing a tubular article 179 which may be used for many purposes. The article 179 is characterized by having thin side walls and a closed bottom wall formed from a single metal blank without metal loss; by having the desired degree of hardness provided in its metal walls by cold working; by having secondary axially extending cup formation 152 at its closed end 148; by having wall portions of varying thickness in secondary cup portion 152; and by having cold welded zone 156 in the bottom wall of secondary cup 152. It will be understood, however, that all of these characteristics need not necessarily be provided in tubular article 179 if not desired or required.

Thus, cold welded zone 156 could be omitted by omitting the operation illustrated in Fig. 7; or such a zone might be provided in another wall portion of article 179. Similarly, secondary cup formation 152 may have another shape or configuration. Also, rounded bottom wall 148, if not desired, may be omitted and article 179 may be formed with a flat bottom wall by changing the configuration of the die arrangement illustrated in Fig. 6.

Furthermore, side walls 175 of tubular article 179 need not necessarily be thinned as at 176 but may be uniform in thickness throughout their extent; or thin wall portion 176 may be relatively longer than shown.

Where it may be desired to form a closed pressure cylinder as the finished article, the upper end of article 179 may be trimmed to exact desired length, since the upper edge may not be uniform because of the drawing through operation. This trimming is indicated diagrammatically by the dot-dash line in Fig. 14. Then thin walled zone 176 of tubular article 179 may be necked in by one or more swaging operations, or by the use of usual necking-in dies, to provide the closed pressure cylinder indicated at 180 in Fig. 15. In reducing the diameter of thin walled section 176 of blank 178 to produce cylinder 180, the diameter reduction is accompanied by thickening of the walls so that the necked in end wall 181 of cylinder 180 has substantially the same thickness as the remaining wall portions of the cylinder. In forming the closed end 181, a projecting neck or thimble 182 may be provided having a central opening 183 forming an access opening to the interior of the cylinder.

Closed pressure cylinders such as the article shown in Fig. 15 are frequently used to contain gases or liquids under pressure which may be introduced through opening 183 after which the opening is closed in any desired manner. The interior of the cylinder is thus subject to considerable internal pressure while the material introduced therein is confined. Normally such pressures would tend to distort thin bottom wall 155 of secondary cup portion 152, as by bulging it to be outwardly convex. However, the cold welding of this bottom wall portion so strengthens and stiffens the metal therein that the same, even though extremely thin, resists distortion by the internal bulging pressure.

When it is desired to discharge the contents of the material confined under pressure within cylinder 180, thin bottom wall 155 and particularly central cold welded zone 156 thereof may be pierced by a sharp instrument or other tool. Such tool may be threaded onto secondary cup 152 by forming threads in the outer surfaces of the side walls thereof. If such threads are formed, shoulder 153 provides a guide for starting the first thread and centering the threading tool.

In connection with all of the cold working operations illustrated, normal press or die lubricants are used, and the starting blank for each operation is preferably bonderized or provided with a usual phosphate coating to assist in holding the lubricant on the surface of the blank.

It has been indicated that the extruded blank 52 after the completion of the operation illustrated in Fig. 3 is normalized. It is to be understood that after such normalizing operation, the blank is then pickled and washed in the usual manner and this may take place just prior to bonderizing the blank in preparation for the next operation illustrated in Fig. 5.

In connection with nosing end wall 181 of cylinder 180 by necking-in or swaging operations, it may be necessary to subject the open end portion of tubular article 179 to a localized stress relief. Frequently it is desirable to similarly subject either the tubular article 179 or the pressure cylinder 180 to a final stress relieving treatment at, say, about 750° F., which treatment will not effect the hardness developed in the cold worked walls of the articles, but, in fact, in some instances, actually may slightly increase the strength or hardness of the article.

Accordingly, the present invention provides new procedures and die arrangements for the manufacture of steel articles by cold shaping in which manufacturing costs are reduced, scrap losses are eliminated, relatively low working pressures are used, die friction is at a minimum, and the metal flow is directed and controlled in various steps to produce the desired hardness in the finished work piece; provides for forming a secondary cup shape at the end of a primary cup formed from a single metal blank; provides for forming dense, sound, strong leak proof, and pressure resisting walls in a cold formed tubular article; provides for cold welding wall portions of a steel article by cold compression working; accomplishes the many new functions hereinabove described; and overcomes many prior art difficulties and solves longstanding problems in the art.

In the foregoing description certain terms have been used for brevity, clearness and understanding; but no unnecessary limitations are to be implied therefrom beyond the requirements of the prior art, because such terms are utilized for descriptive purposes herein and not for the purpose of limitation and are intended to be broadly construed.

Moreover, the description of the improvements is by way of example and the scope of the present invention is not limited to the exact details illustrated, or to the specific articles shown, or to the uses of the articles described.

Having now described the features, discoveries and principles of the invention, the operations and procedures of preferred method steps thereof, the construction and operation of the new die arrangements, the characteristics of the new articles, and the advantageous new and useful results obtained thereby; the new and useful products, apparatus, methods, steps, operations, procedures, discoveries, principles, elements, combinations, and subcombinations, and mechanical equivalents obvious to those skilled in the art, are set forth in the appended claims.

I claim:

1. In a method of cold working a solid steel blank to form a cup-shaped article, the steps of forming the blank to primary cup-shape with a secondary cup-shape projecting from the bottom wall of the primary cup, providing a tapered inner surface for the bottom wall of the primary cup, then laterally confining the lower end of the primary cup, and axially compressing the bottom wall of the primary cup and displacing metal therein to flatten the same and form a continuous raised rib internally around the juncture of the secondary cup walls with the primary cup bottom wall.

2. In a method of cold working a solid steel blank to form a cup-shaped article, the steps of forming the blank to primary cup-shape with a secondary cup-shape projecting from the bottom wall of the primary cup, providing a tapered inner surface for the bottom wall of the primary cup and tapered side and flat bottom walls for the secondary cup, then laterally confining the lower end of the primary cup, then axially compressing the metal in the primary cup bottom wall and secondary cup walls to flatten and thin the primary cup bottom wall, to thin and elongate the secondary cup side walls, and to thin the secondary cup bottom wall; at the same time by said axial pressure pushing the secondary cup into a smaller sized cavity to change the taper of its side walls, and at the same time by said axial pressure displacing metal in the blank to form a continuous raised rib within the primary cup around the juncture of the secondary cup walls with the primary cup bottom wall.

3. In a method of cold working a cup-shaped steel blank having a secondary cup portion projecting axially of its bottom wall, the steps of laterally confining the lower end of the blank and axially compressing the metal in the bottom wall and secondary cup portion to thin and flatten the blank bottom wall, to reduce the diameter and thin and elongate the secondary cup portion thereof, and to form a continuous annular rib internally of the blank where the secondary cup portion merges with the blank bottom wall.

4. In a method of cold working a cup-shaped steel blank having a secondary cup portion projecting from the bottom of the blank, the steps of forming a raised internal rib at the juncture of the secondary cup side walls with the blank bottom wall, applying axial pressure to said rib, and displacing metal in the secondary cup side walls and rib downward and inward to elongate and reduce the diameter of the secondary cup portion.

5. In a method of cold working a cup-shaped steel blank having a secondary cup portion projecting from the bottom of the blank, the steps of forming a raised internal rib at the juncture of the secondary cup side walls with the blank bottom wall, applying axial pressure to said rib, displacing metal in the secondary cup side walls and rib downward and inward to elongate and reduce the diameter of the secondary cup portion, and directing and controlling the displacement and flow of metal in the secondary cup side walls during the application of said pressure to control the thickness of the metal in the resulting secondary cup portion side walls.

6. The method of cold working a solid steel blank to form a cup-shaped article, including the steps of forming a primary cup-shaped blank having a secondary cup-shaped nipple projecting from the primary cup bottom wall, forming a continuous raised rib internally of the primary cup around the juncture of the secondary cup side walls with the primary cup bottom wall, and axially elongating the side walls and reducing the diameter of the secondary cup by pressing and displacing metal in the raised rib in the direction in which the secondary cup projects from the primary cup.

7. The method of cold working a solid steel blank to form a cup-shaped article having primary and secondary cup portions, the steps of laterally confining the blank and applying axial compression thereto to squeeze metal in the lower portion thereof laterally inward and downward and to downwardly displace metal in the upper central portion thereof, then laterally confining the lower portion of the blank and applying further axial compression to the top of the blank to further displace the metal from the upper central portion thereof to the lower portion of the blank while flowing intervening metal around the downwardly displaced metal in the opposite direction to form primary and secondary cup-shapes, then laterally confining the lower portion of the blank and applying further axial compression flatwise to the bottom walls of the primary and secondary cups to thin the same, at the same time laterally inwardly squeezing the bottom wall of the secondary cup, then confining the lower portion of the primary cup and applying further axial compression to the bottom wall thereof and at the same time to the top of the side walls of the secondary cup to reform, thin and coin the bottom wall of the primary cup and to extrude and elongate metal in the side walls of the secondary cup, and then laterally confining the side walls of the secondary cup and axially compressing the bottom wall thereof.

8. In a method of cold working a solid steel blank, the steps of laterally confining the lower end of the blank and axially compressing the central portion of the upper end of the blank thereby squeezing and flowing metal in the lower portion of the blank laterally inward and displacing, flowing and expanding other metal in the side walls of the blank outward to form side walls with true concentricity at any section, and by said axial compression displacing and flowing other metal in the lower portion of the blank inward and downward to form an axially projecting nipple on the lower end of the blank; then further confining the lower end of the thus formed blank and axially compressing the central portion of the upper end of the blank thereby displacing, expanding and backwardly extruding metal in the lower portion of the blank to form the tubular side walls of a primary cup-shape, and at the same time applying an expanding and flatwise pressure to a smaller central portion of the blank to form a flat bottomed tapered walled secondary cup-shape in the nipple; then laterally confining the lower end of the primary cup and axially compressing metal in the bottom wall thereof to flatten and thin the same, and at the same time axially compressing the metal in the secondary cup and elongating the side walls and reducing the diameter of portions thereof, and also by said axial compression displacing metal in the blank to form a continuous raised rib internally around the juncture of the secondary cup walls with the primary cup bottom wall; then again laterally confining the lower end of the blank and axially compressing the metal in the bottom wall to form a thin curved shape, and at the same time applying axial pressure to said rib and displacing and extruding metal in the secondary cup side walls downward and inward to elongate and reduce the diameter and form a cylindrical secondary cup portion; and then further laterally confining the bottom wall of the secondary cup portion and flatwise compressing the same while thus confined to thin and compress metal in a central zone of said bottom wall.

9. In a method of cold working a solid steel blank, the steps of laterally confining the lower end of the blank and axially compressing the central portion of the upper end of the blank thereby squeezing and flowing metal in the lower portion of the blank laterally inward and displacing, flowing and expanding other metal in the side walls of the blank outward to form side walls with true concentricity at any section, and by said axial compression displacing and flowing other metal in the lower portion of the blank inward and downward to form an axially projecting nipple on the lower end of the blank, then further confining the lower end of the thus formed blank and axially compressing the central portion of the upper end of the blank thereby displacing, expanding and backwardly extruding metal in the lower portion of the blank to form the tubular side walls of a primary cup-shape, and at the same time applying an expanding and flatwise pressure to a smaller central portion of the blank to form a flat bottomed tapered walled secondary cup-shape in the nipple; then laterally confining the lower end of the primary cup and axially compressing metal in the bottom wall thereof to flatten and thin the same, and at the same time axially compressing the metal in the secondary cup and elongating the side walls and reducing the diameter of portions thereof, and also by said axial compression displacing metal in the blank to form a continuous raised rib internally around the juncture of the secondary cup walls with the primary cup bottom wall; then again laterally confining the lower end of the blank and axially compressing the metal in the bottom wall to form a thin curved shape, and at the same time applying axial pressure to said rib and displacing and extruding metal in the secondary cup side walls downward and inward to elongate and reduce the diameter and form a cylindrical secondary cup portion; then further laterally confining the bottom wall of the secondary cup portion and flatwise compressing the same while thus confined to thin and compress metal in a central zone of said bottom wall; and then forwardly extruding the primary cup side walls to thin and elongate the same.

10. The method of cold working a solid steel blank to form a closed-bottom tubular article, including the steps of forming a primary cup-shaped blank having a secondary cup-shaped nipple projecting from the primary cup bottom wall, forming a continuous raised rib internally of the primary cup around the juncture of the secondary cup side walls with the primary cup bottom wall, axially elongating the side walls and reducing the diameter of the secondary cup by pressing and displacing metal in the raised rib in the direction in which the secondary cup projects from the primary cup, and then forwardly extruding the primary cup side walls to thin and elongate the same.

11. In a method of cold working a solid steel blank, the steps of laterally confining only the lower end portion of the blank, axially supporting an annular zone around the bottom of the lower end of the blank on intersecting downwardly and radially-inwardly sloping surfaces; applying substantially flatwise, axial, concentric, downward pressure to the upper central portion of the blank to form a relatively deep central recess concentrically in the upper end of the blank; forming a tapered concentric side portion for said recess; by said lateral confinement and sloping supporting surfaces applying upwardly and inwardly directed reactive pressure to the bottom and side of the blank annularly around the lower corner while the lower central portion of the blank is axially unconfined to thereby squeeze the lower portion of the blank laterally inward; said axial and reactive pressures expanding the unconfined upper portion of the blank and reducing the diameter of the lower laterally confined portion of the blank to form side walls with true concentricity at any section concentric with the flat central recess and to form a tapered angular side wall portion extending upward from the lower corner portion of the blank; said axial and reactive pressures also directing metal flow inward and downward from the lower corner portion of the blank to form a tapered annular bottom surface around the lower corner of the blank; said axial and reactive pressures and said lateral confinement and sloping supporting surfaces also directing metal flow from the central axially unconfined portion of the bottom of the blank inward and downward thereby forming a relatively small concentric axially projecting solid metal nipple having a tapered wall portion on the bottom of the blank within the tapered annular lower corner bottom surface.

12. In a method of cold working a solid steel blank to form a blank having a primary cup shape and a substantially smaller hollow secondary cup shape projecting concentrically axially from the bottom of the primary cup shape, the steps of laterally confining only the lower end portion of the blank; axially supporting an annular zone around the bottom of the lower end of the blank; applying substantially flatwise, axial, concentric, downward pressure to the upper central portion of the blank to form a relatively deep, concentric primary recess therein having a downwardly-inwardly tapered side portion; by said lateral confinement and axial-annular-zone-support applying upwardly and inwardly-directed reactive pressure to the bottom of the blank and flowing metal from a central axially unconfined portion of the bottom of the blank inward and downward to form a relatively small, concentric, axially-projecting solid metal nipple having a tapered wall portion on the bottom of the blank; then laterally confining the lower end of the recess-formed and projecting nipple-formed blank and applying expanding and flatwise axial pressure to a small central portion of the blank at the bottom of said recess thereby displacing metal in the nipple downward and outward to enlarge the diameter of the nipple and to form a small hollow nipple projecting concentrically from the bottom of the blank; at the same time axially compressing an annular zone at the bottom of the primary recess surrounding the secondary recess thereby displacing, expanding and backwardly extruding metal in the blank to increase the diameter of the blank and to form the side walls of a primary cup shape; centering the application of said annular zone applied axial compression by the tapered primary recess portion; and directing and controlling the flow of metal during the application of said annular zone applied axial compression to prevent concave mushrooming of the inner surfaces of the side walls of the primary cup shape while the secondary recess is being formed.

13. In a method of cold working a generally flat-bottomed, cup-shaped steel blank having a tapered secondary cup portion projecting axially of the bottom wall of the generally cup-shaped blank, the steps of laterally confining the lower end of the blank, applying axial pressure to the metal in the bottom wall of the blank and by said pressure deforming, displacing, flowing and coining the flat-bottomed bottom wall metal to curved bottom wall shape and thinning the metal in the curved wall; and at the same time pushing the tapered secondary cup portion by applying axial pressure to the open end of the secondary cup walls as the curved bottom wall shape is being formed into a cylindrical cavity of smaller diameter to form a reduced-diameter cylindrical secondary cup portion; and at the same time by the axial pressure applied to the secondary cup walls forwardly extruding metal in the side walls of the reduced-diameter cylindrically-formed secondary cup portion to elongate the same axially.

14. In a method of cold working the bottom wall of a secondary cup projecting from the bottom wall of a cup-shaped steel blank, the steps of laterally confining the side walls of the secondary cup snugly within a die cavity, axially supporting the lower annular corner of the secondary cup bottom wall on a reduced-diameter angular shoulder offset upwardly from the closed bottom of the die cavity, applying axial pressure to the inside of the secondary cup bottom wall toward the closed bottom of the die cavity and laterally outwardly toward said offset die cavity shoulder; at the same time applying axial pressure to and displacing metal at the juncture between the bottom wall of the cup-shaped blank and the upper end of the secondary cup side walls; and by said axial pressures reducing the diameter of the lower corner of the secondary cup portion at and within the angular die shoulder and flatwise compressing metal in a central zone of the secondary cup bottom wall to thin the same.

References Cited in the file of this patent

UNITED STATES PATENTS

| | | |
|---|---|---|
| 159,883 | Bayliss | Feb. 16, 1875 |
| 1,045,629 | Stuart | Nov. 26, 1912 |
| 1,080,747 | Buckley | Dec. 9, 1913 |
| 1,082,200 | Knaebel | Dec. 23, 1913 |
| 1,082,910 | Rockwell | Dec. 30, 1913 |
| 1,101,813 | Rice | June 30, 1914 |
| 1,314,366 | Reigart | Aug. 26, 1919 |
| 1,403,460 | Talty | Jan. 10, 1922 |
| 1,413,284 | Maloney | Apr. 18, 1922 |
| 1,444,270 | Pinchart et al. | Feb. 6, 1923 |
| 1,463,280 | Arnold | July 31, 1923 |
| 1,468,092 | Towne | Sept. 18, 1923 |
| 1,709,328 | Stover | Apr. 16, 1929 |
| 1,722,634 | Kinkead | July 30, 1929 |
| 1,753,259 | Badger | Apr. 8, 1930 |
| 2,015,904 | Marsh | Oct. 1, 1935 |
| 2,024,286 | Handler | Dec. 17, 1935 |
| 2,028,996 | Sautier | Jan. 28, 1936 |
| 2,035,004 | Van Ness | Mar. 24, 1936 |
| 2,088,525 | Leussler | July 27, 1937 |
| 2,123,165 | Brown | July 12, 1938 |
| 2,125,250 | Temple | July 26, 1938 |
| 2,127,712 | Bart | Aug. 23, 1938 |
| 2,149,757 | Brink | Mar. 7, 1939 |
| 2,162,776 | Frider | June 20, 1939 |
| 2,182,922 | Heschel | Dec. 12, 1939 |
| 2,193,245 | Buxton | Mar. 12, 1940 |
| 2,215,943 | Traut | Sept. 24, 1940 |
| 2,244,954 | Lenz et al. | June 10, 1941 |
| 2,328,098 | Remington | Aug. 31, 1943 |

(Other references on following page)

UNITED STATES PATENTS

| | | |
|---|---|---|
| 2,408,596 | Bednar et al. | Oct. 1, 1946 |
| 2,522,408 | Sowter | Sept. 12, 1950 |
| 2,533,942 | Jongedyk | Dec. 12, 1950 |

FOREIGN PATENTS

| | | |
|---|---|---|
| 425,801 | France | Apr. 13, 1911 |
| 2,459 | Great Britain | Feb. 16, 1915 |
| 430,949 | Germany | June 25, 1926 |
| 402,795 | Great Britain | Dec. 11, 1933 |

OTHER REFERENCES

Cold Shaping of Steel, pages 33, 34, 66–72 and 108, July 1, 1947.

Iron Age, pages 90–105, Aug. 4, 1949.

Iron Age, pages 69–75, Oct. 19, 1950.